United States Patent
Kim et al.

(10) Patent No.: US 12,330,039 B2
(45) Date of Patent: Jun. 17, 2025

(54) IMMERSIVE VIRTUAL GOLF SERVICE WITH REALITY USING XR DEVICE

(71) Applicants: Kineverse Inc., Yongin-si (KR); Konkuk University Industrial Cooperation Corp, Seoul (KR)

(72) Inventors: Gyoung Mo Kim, Seongnam-si (KR); Sang Geun Yu, Seoul (KR); Sungwon Ryu, Seoul (KR); In Gul Yu, Yongin-si (KR)

(73) Assignees: Kineverse Inc., Yongin-si (KR); Konkuk University Industrial Cooperation Corp, Seoul (KR)

( * ) Notice: Subject to any disclaimer, the term of this patent is extended or adjusted under 35 U.S.C. 154(b) by 0 days.

(21) Appl. No.: 18/817,694

(22) Filed: Aug. 28, 2024

(65) Prior Publication Data

US 2025/0073557 A1   Mar. 6, 2025

(51) Int. Cl.
*A63B 69/36* (2006.01)
*A63B 71/06* (2006.01)
*G06F 3/01* (2006.01)
*G06N 3/067* (2006.01)

(52) U.S. Cl.
CPC ...... *A63B 69/3623* (2013.01); *A63B 71/0619* (2013.01); *G06F 3/012* (2013.01); *G06N 3/067* (2013.01); *A63B 2071/0666* (2013.01)

(58) Field of Classification Search
CPC ............ A63B 69/3623; A63B 71/0619; A63B 2071/0666; G06F 3/012; G06N 3/067

USPC ....... 473/156, 197, 221, 226, 228, 266, 407, 473/409, 220
See application file for complete search history.

(56) References Cited

U.S. PATENT DOCUMENTS

| | | | |
|---|---|---|---|
| 8,597,142 B2 * | 12/2013 | Mayles | A63F 13/213 473/226 |
| 10,318,085 B2 * | 6/2019 | Chan | H10K 50/81 |
| 11,113,887 B2 * | 9/2021 | Kopeinigg | G06T 7/55 |
| 2019/0019321 A1 * | 1/2019 | Thielen | G09B 19/0038 |
| 2020/0005544 A1 * | 1/2020 | Kim | G06T 13/40 |
| 2020/0099858 A1 * | 3/2020 | Lee | G06V 40/23 |
| 2020/0222757 A1 * | 7/2020 | Yang | G06V 40/23 |
| 2022/0379170 A1 * | 12/2022 | Menaker | G06V 40/23 |
| 2023/0398427 A1 * | 12/2023 | Aksamit | A63F 13/428 |

FOREIGN PATENT DOCUMENTS

KR    10-1430723 B1    8/2014
KR    10-2023-0020335 A    2/2023

\* cited by examiner

*Primary Examiner* — Nini F Legesse
(74) *Attorney, Agent, or Firm* — Bridgeway IP Law Group, PLLC; Jihun Kim

(57) ABSTRACT

One example relates to a method for providing an immersive virtual golf service using an eXtended Reality (XR). The method may comprise: capturing an image of an actual golf ball placed on a ground through a camera of an XR device; reproducing and displaying the image within a virtual golf environment displayed on a display unit of the XR device; capturing, in real-time, a golf swing of a user through the camera of the XR device; analyzing a golf swing motion of the user in real-time using an artificial neural network model; and reproducing and displaying the analyzed golf swing motion within the virtual golf environment displayed on the display unit of the XR device.

16 Claims, 15 Drawing Sheets

IMMERSIVE VIRTUAL GOLF SERVICE WITH REALITY USING XR DEVICE

CROSS-REFERENCE TO RELATED APPLICATIONS

This application claims the priority of Korean Patent Application No. 10-2023-0114946 filed on Aug. 30, 2023, in the Korean Intellectual Property Office, the disclosure of which is incorporated herein by reference.

BACKGROUND OF THE DISCLOSURE

Technical Field

The present disclosure relates to an immersive virtual golf service using an XR device.

Background Art

As the number of golfers increases, a so-called screen golf system has emerged, allowing users to practice golf and enjoy virtual golf games using virtual golf simulation devices.

Such screen golf systems install a screen indoors to display a virtual golf course. When a golfer strikes a golf ball towards the screen, the system detects the speed, direction, and other parameters of the golf ball and displays its trajectory on the screen.

In this way, screen golf systems implemented by virtual golf simulation devices have the feature of providing a realistic experience similar to playing on an actual golf course, while allowing the golfer to hit the golf ball as they would at a golf practice range.

In screen golf systems implemented by virtual golf simulation devices, not only can they provide a level of realism similar to that of actual golf rounds on a real golf course, but they have also expanded the market by offering various content that would be difficult to provide at real golf courses or practice ranges. This is due to the advanced devices and systems that deliver these services, which have sparked interest among golfers.

Moreover, separate from actual golf rounds on real courses, screen golf driven by virtual golf simulations has established itself as a distinct culture or even a segment of e-sports. This has led to the formation of a unique culture enjoyed by individuals who engage in and appreciate this independent experience.

FIG. 1 is a diagram illustrating an example of a sensing device applied in a conventional screen golf system.

As shown in FIG. 1, within the booth (BT) set up for screen golf, a screen 12 is installed in front of the user P, and an image output device 400 projects an image SI of a golf course onto the screen 12. A hitting mat 10 is placed on the floor B1 of the booth, and when the user P hits the golf ball 1, a first camera 51 and a second camera 52 installed on the ceiling of the booth BT capture the hit golf ball 1 and transmit the images to the simulator SM. The simulator SM analyzes the images captured by each camera to calculate the position information of the golf ball 1 in three-dimensional space. Based on the calculated position information, the simulator calculates the motion parameters of the golf ball 1 and generates a simulated trajectory of the ball. This simulation is then displayed over the image of the golf course on the screen, allowing the ball's trajectory to be visualized in the context of the golf course.

As shown in FIG. 1, in the conventional system, the first camera 51 and the second camera 52 of the sensing device used to detect the golf ball in a virtual golf simulation device were installed on the ceiling of the booth BT, positioned close to the user's P head.

In other words, traditionally, a stereoscopic method, using two cameras, was employed to obtain the three-dimensional coordinates of the golf ball 1.

However, this conventional stereoscopic method was limited to obtaining the coordinates of the golf ball and did not analyze the user's P motion or the corresponding swing trajectory of the golf club. As a result, there has been a sense of disconnection from real golf, as the system lacked the ability to provide a comprehensive analysis of the user's actions and their impact on the golf swing.

SUMMARY OF THE DISCLOSURE

Recently, the development and widespread adoption of eXtended Reality (XR) devices have been increasing.

Additionally, artificial intelligence (AI) has been progressively advancing. AI refers to the artificial simulation of human intelligence, including capabilities such as recognition, classification, inference, prediction, and control/decision-making.

Therefore, the inventors of the present disclosure recognized the need to develop a more immersive virtual golf game service using XR devices and artificial intelligence.

To achieve the aforementioned objectives, one example of the present disclosure proposes a method for providing an immersive virtual golf service using an eXtended Reality (XR). The method may comprise: capturing an image of an actual golf ball placed on a ground through a camera of an XR device; reproducing and displaying the image within a virtual golf environment displayed on a display unit of the XR device; capturing, in real-time, a golf swing of a user through the camera of the XR device; analyzing a golf swing motion of the user in real-time using an artificial neural network model; and reproducing and displaying the analyzed golf swing motion within the virtual golf environment displayed on the display unit of the XR device.

The artificial neural network model may be stored in the XR device.

The artificial neural network model may include: a first artificial neural network model configured for object detection, object segmentation, or object tracking.

The artificial neural network model may include: a second artificial neural network model configured for a pose estimation.

The artificial neural network model may include: a third artificial neural network model configured for scaling.

The artificial neural network model may include: a fourth artificial neural network model configured for motion prediction.

The camera of the XR device may include at least one of: a first plurality of cameras, which are arranged to forward; or a second plurality of cameras, which are arranged to downward.

The XR device may include: a neural processing unit configured to perform computations for the artificial neural network model.

The method may further comprise: displaying a virtual golfer's swing in caparison with a user's golf swing.

The method may further comprise: scaling a body of a virtual golfer displayed on the XR device based on body dimensions of the user.

To achieve the aforementioned objectives, one example of the present disclosure proposes an eXtended Reality (XR) device. The XR device may comprise: a camera; a display unit; and a controller configured to control the camera and display and perform steps of: capturing an image of an actual golf ball placed on a ground through the camera, reproducing and displaying the image within a virtual golf environment displayed on the display unit, capturing, in real-time, a golf swing of a user through the camera, analyzing a golf swing motion of the user in real-time using an artificial neural network model, and reproducing and displaying the analyzed golf swing motion within the virtual golf environment displayed on the display unit.

To achieve the aforementioned objectives, one example of the present disclosure proposes a non-volatile computer-readable storage medium storing instructions, the instructions, when executed by one or more processors, causing the one or more processors to perform steps comprising: capturing an image of an actual golf ball placed on a ground through a camera of an eXtended Reality (XR) device; reproducing and displaying the image within a virtual golf environment displayed on a display unit of the XR device; capturing, in real-time, a golf swing of a user through the camera of the XR device; analyzing a golf swing motion of the user in real-time using an artificial neural network model; and reproducing and displaying the analyzed golf swing motion within the virtual golf environment displayed on the display unit of the XR device.

According to the examples of the present disclosure, a more immersive virtual golf game service can be provided using XR devices and artificial intelligence.

DETAILED DESCRIPTION OF THE EMBODIMENT

Figure 1:
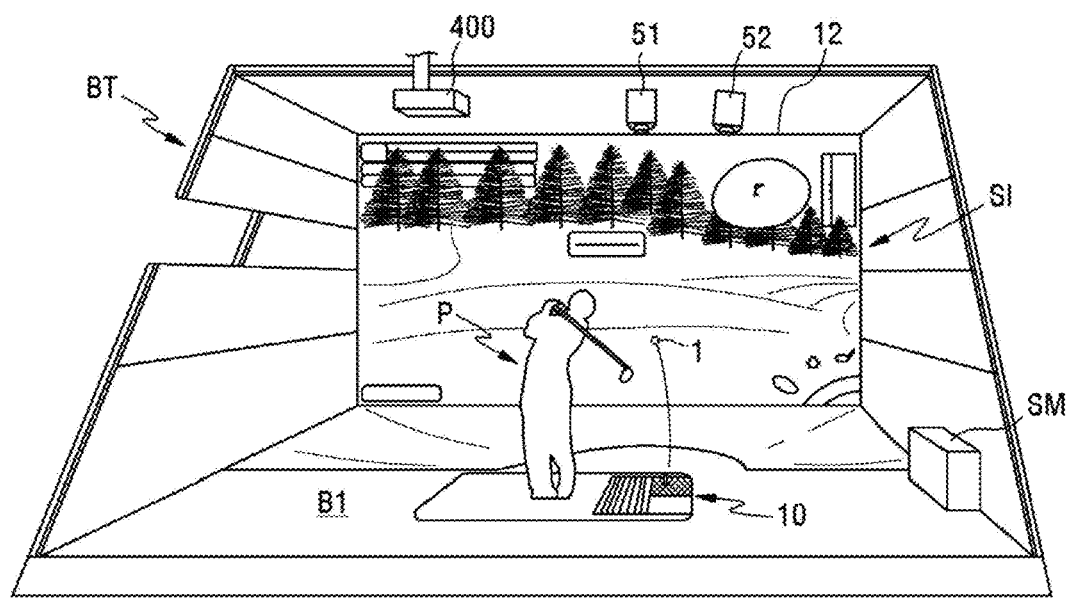
FIG. 1 is a diagram illustrating an example of a sensing device applied in a conventional screen golf system.

Specific structural or step-by-step descriptions for the embodiments according to the concept of the present disclosure disclosed in the present disclosure or application are merely illustrative for the purpose of describing the embodiments according to the concept of the present disclosure. The examples according to the concept of the present disclosure may be carried out in various forms and are not interpreted as that the present disclosure is limited to the examples described in the present disclosure or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are in line with the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present disclosure are used only to describe specific examples, and are not intended to limit the present disclosure. A singular form may include a plural form if there is no clearly opposite meaning in the context. In the present disclosure, it should be understood that terms "include" or "have" indicate that a feature, a number, a step, an operation, a component, a part, or a combination thereof described in the present disclosure is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in the present disclosure.

In describing examples, descriptions of technical contents that are well known in the art to which the present disclosure pertains and are not directly related to the present disclosure will be omitted. The omission is to convey the gist of the present disclosure more clearly without the obscuration of the unnecessary description of well-known technical details.

<Artificial Intelligence>

Humans are equipped with intelligence capable of recognition, classification, inference, prediction, control/decision making, and the like. Artificial intelligence (AI) refers to the artificial imitation of human intelligence.

The human brain consists of numerous nerve cells called neurons. Each neuron is connected to hundreds to thousands of other neurons through connections called synapses. In order to imitate human intelligence, modeling the operating principle of biological neurons and the connection between neurons is called an artificial neural network model. In other words, an artificial neural network is a system in which nodes that imitate neurons are connected in a layer structure.

These artificial neural network models are divided into 'single-layer neural networks' and 'multi-layer neural network' according to the number of layers. A typical multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts characteristics, and transfers them to the output layer. (3) The output layer receives signals from the hidden layer and outputs the result. The input signal between neurons is multiplied by each connection weight having a value between 0 and 1 and summed. If this sum is greater than the neuron's threshold, the neuron is activated and implemented as an output value through an activation function.

Meanwhile, in order to implement higher artificial intelligence, an artificial neural network in which the number of hidden layers is increased is called a deep neural network (DNN).

DNNs are being developed in various structures. For example, a convolutional neural network (CNN), which is an example of DNN, is known to be easy to extract features of an input value (video or image) and identify a pattern of the extracted output value. A CNN may be configured in a form in which a convolution operation, an activation function operation, a pooling operation, and the like are processed in a specific order.

For example, in each layer of the DNN, parameters (i.e., input values, output values, weights or kernels, and the like) may be a matrix composed of a plurality of channels. Parameters can be processed in the NPU by convolution or matrix multiplication. In each layer, an output value that has been processed is generated.

For example, a transformer is a DNN based on attention technology. Transformers utilize a number of matrix multiplication operations. The transformer may obtain an output value of attention (Q, K, V) by using parameters such as an input value and a query (Q), a key (K), and a value (V). The transformer can process various inference operations based on the output value (i.e., attention (Q, K, V)). Transformers tend to show better inference performance than CNNs.

Figure 2:
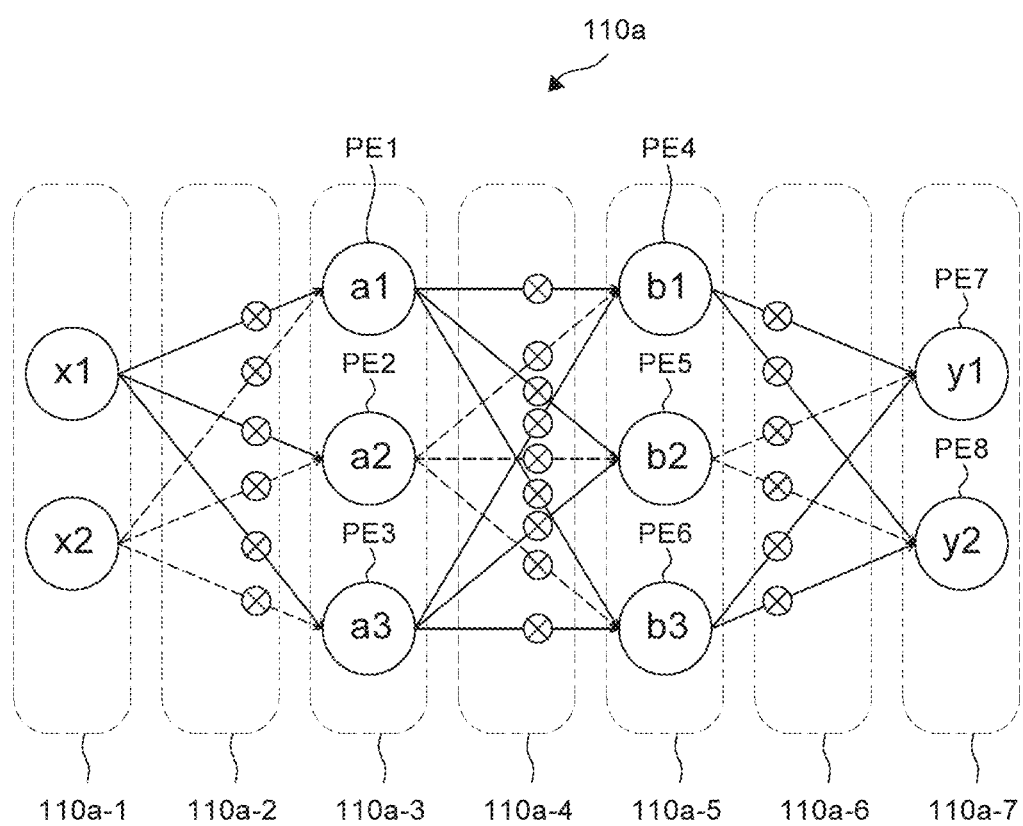
FIG. 2 illustrates an exemplary artificial neural network model.

FIG. 2 illustrates an exemplary artificial neural network model.

Hereinafter, an operation of an exemplary artificial neural network model 110*a* which may operate in the neural processing unit 100 will be explained.

The exemplary artificial neural network model 110*a* of FIG. 2 may be an artificial neural network trained to perform various inference functions such as object detection or voice recognition.

The artificial neural network model 110*a* may be a deep neural network (DNN).

However, the artificial neural network model 110*a* according to the examples of the present disclosure is not limited to the deep neural network.

For example, the artificial neural network model can be a model such as ViT, DaViT, Mobile ViT, Swin-Transformer, Transformer, YOLO (You Only Look Once), CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and the like. However, the artificial neural network model 110*a* may be an ensemble model based on at least two different models.

Hereinafter, an inference process by the exemplary artificial neural network model 110*a* will be described.

The artificial neural network model 110*a* may be an exemplary deep neural network model including an input layer 110*a*-1, a first connection network 110*a*-2, a first hidden layer 110*a*-3, a second connection network 110*a*-4, a second hidden layer 110*a*-5, a third connection network 110*a*-6, and an output layer 110*a*-7. However, the present disclosure is not limited only to the artificial neural network model illustrated in FIG. 2. The first hidden layer 110*a*-3 and the second hidden layer 110*a*-5 may also be referred to as a plurality of hidden layers.

The input layer 110*a*-1 may exemplarily include input nodes x1 and x2. That is, the input layer 110*a*-1 may include information about two input values.

For example, the first connection network 110*a*-2 may include information about six weight values for connecting nodes of the input layer 110*a*-1 to nodes of the first hidden layer 110*a*-3, respectively. Each weight value is multiplied with the input node value, and an accumulated value of the multiplied values is stored in the first hidden layer 110*a*-3. Here, the nodes and weights may be referred to as parameters.

For example, the first hidden layer 110*a*-3 may include nodes a1, a2, and a3. That is, the first hidden layer 110*a*-3 may include information about three node values.

The first processing element PE1 of FIG. 2 may perform the MAC operation of the a1 node.

The second processing element PE2 of FIG. 2 may perform the MAC operation of the a2 node.

The third processing element PE3 of FIG. 2 may perform the MAC operation of the a3 node.

For example, the second connection network 110*a*-4 may include information about nine weight values for connecting nodes of the first hidden layer 110*a*-3 to nodes of the second hidden layer 110*a*-5, respectively. The weight value of the second connection network 110*a*-4 is multiplied with the node value input from the corresponding first hidden layer 110*a*-3 and the accumulated value of the multiplied values is stored in the second hidden layer 110*a*-5.

For example, the second hidden layer 110*a*-5 may include nodes b1, b2, and b3. That is, the second hidden layer 110*a*-5 may include information about three node values.

The fourth processing element PE4 of FIG. 2 may process the operation of the b1 node.

The fifth processing element PE5 of FIG. 2 may process the operation of node b2.

The sixth processing element PE6 of FIG. 2 may process the operation of node b3.

For example, the third connection network 110*a*-6 may include information about six weight values which connect nodes of the second hidden layer 110*a*-5 and nodes of the output layer 110*a*-7, respectively. The weight value of the third connection network 110*a*-6 is multiplied with the node value input from the second hidden layer 110*a*-5, and the accumulated value of the multiplied values is stored in the output layer 110*a*-7.

For example, the output layer 110*a*-7 may include nodes y1 and y2. That is, the output layer 110*a*-7 may include information about two node values.

The seventh processing element PE7 of FIG. 2 may process the operation of node y1.

The eighth processing element PE8 of FIG. 2 may process the operation of node y2.

Each node may correspond to a feature value, and the feature value may correspond to a feature map.

Figure 3A:
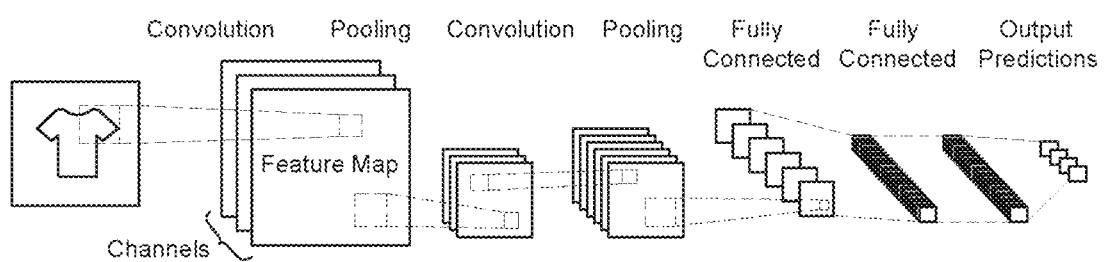
FIG. 3A is a diagram for explaining the basic structure of a convolutional neural network (CNN)

FIG. 3A is a diagram for explaining the basic structure of a convolutional neural network (CNN).

Referring to FIG. 3A, an input image may be displayed as a two-dimensional matrix composed of rows of a specific size and columns of a specific size. An input image may have a plurality of channels, where the channels may represent the number of color components of the input data image.

The convolution process means performing a convolution operation with a kernel while traversing the input image at specified intervals.

A convolutional neural network may have a structure in which an output value (convolution or matrix multiplication) of a current layer is transferred as an input value of a next layer.

For example, convolution is defined by two main parameters (input feature map and kernel). Parameters may include input feature maps, output feature maps, activation maps, weights, kernels, attention (Q, K, V) values, and the like.

Convolution slides the kernel window over the input feature map. The step size by which the kernel slides over the input feature map is called the stride.

After convolution, pooling may be applied. In addition, a fully-connected (FC) layer may be disposed at an end of the convolutional neural network.

Figure 3B:
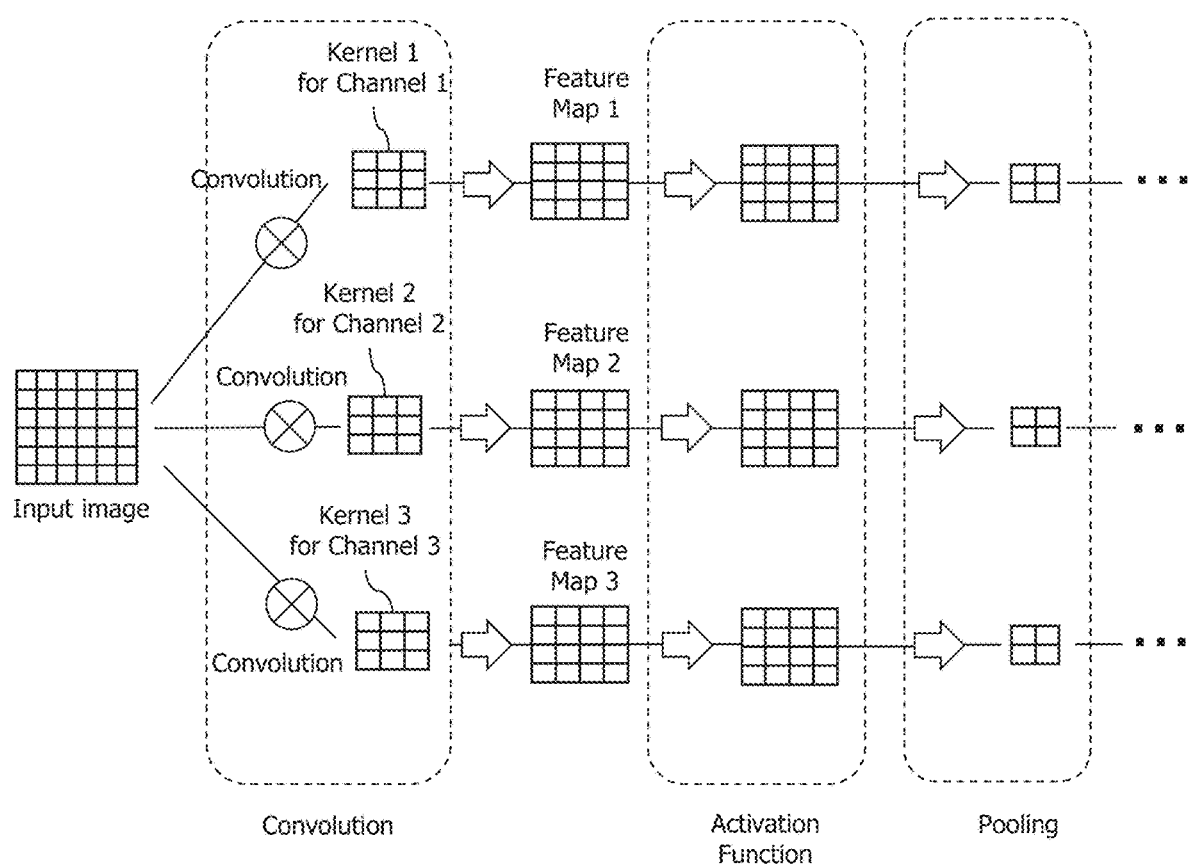
FIG. 3B is a comprehensive diagram illustrating the operation of a convolutional neural network.

FIG. 3B is a comprehensive diagram illustrating the operation of a convolutional neural network.

Referring to FIG. 3B, an input image is exemplarily represented as a two-dimensional matrix having a size of 6×6. In addition, FIG. 3B exemplarily illustrates three nodes, channel 1, channel 2, and channel 3.

First, the convolution operation will be described.

The input image (shown as an example of size 6×6 in FIG. 3B) is convolved with a kernel 1 (shown as an example of size 3×3 in FIG. 2B) for channel 1 at the first node, resulting in the output feature map 1 (shown as an example of size 4×4 in FIG. 3B). Similarly, the input image (shown as an example of size 6×6 in FIG. 3B) is convolved with a kernel 2 (shown as an example of size 3×3 in FIG. 3B) for channel 2 at the second node, resulting in the output feature map 2 (shown as an example of size 4×4 in FIG. 3B). Additionally, the input image is convolved with a kernel 3 (shown as an example of size 3×3 in FIG. 3B) for channel 3 at the third node, resulting in the output feature map 3 (shown as an example of size 4×4 in FIG. 3B).

To process each convolution, the processing elements PE1 to PE12 of the neural processing unit 100 are configured to perform a MAC operation.

Next, the operation of the activation function will be described.

The feature map 1, the feature map 2, and the feature map 3 (which are represented as 4×4 examples in FIG. 3B) generated from convolutional operations can be subjected to activation functions. The output after the activation function is applied may have a size of 4×4, for example.

Next, a pooling operation will be described.

Feature map 1, feature map 2, and feature map 3 output from the activation function (each size is exemplarily represented as 4×4 in FIG. 3B) are input to three nodes. Pooling may be performed by receiving feature maps output from the activation function as inputs. The pooling may reduce the size or emphasize a specific value in the matrix. Pooling methods include maximum pooling, average pooling, and minimum pooling. Maximum pooling is used to collect the maximum values in a specific region of the matrix, and average pooling can be used to find the average within a specific region.

In the example of FIG. 3B, it is shown that a feature map having a size of 4×4 is reduced to a size of 2×2 by pooling.

Specifically, the first node receives feature map 1 for channel 1 as an input, performs pooling, and outputs, for example, a 2×2 matrix. The second node receives feature map 2 for channel 2 as an input, performs pooling, and outputs, for example, a 2×2 matrix. The third node receives feature map 3 for channel 3 as an input, performs pooling, and outputs, for example, a 2×2 matrix.

The aforementioned convolution, activation function, and pooling are repeated, and finally, it can be output as fully connected. The corresponding output may be input again to an artificial neural network for image recognition. However, the present disclosure is not limited to the sizes of feature maps and kernels.

The CNN described so far is the most used method in the field of computer vision among various deep neural network (DNN) methods. In particular, CNNs have shown remarkable performance in various research areas performing various tasks such as image classification and object detection.

Meanwhile, there are ongoing efforts to apply YOLO (You Only Look Once), one of the artificial neural network models for real-time object detection, across various fields. YOLO is a state-of-the-art real-time object detection model. It offers faster and more accurate data processing speeds compared to traditional models. YOLO works by dividing the input image into a grid, then passing it through the neural network to generate bounding boxes and class predictions, which are used to determine the final detection output.

I. First Disclosure of the Specification

The first disclosure proposes analyzing and learning a user's golf swing motion to build an artificial intelligence model. Additionally, the first disclosure proposes measuring and tracking the movement of a golf ball that is impacted by the user's golf club and then learning this data to build an artificial intelligence model.

This will be explained in more detail with reference to the drawings as follows.

Figure 4:
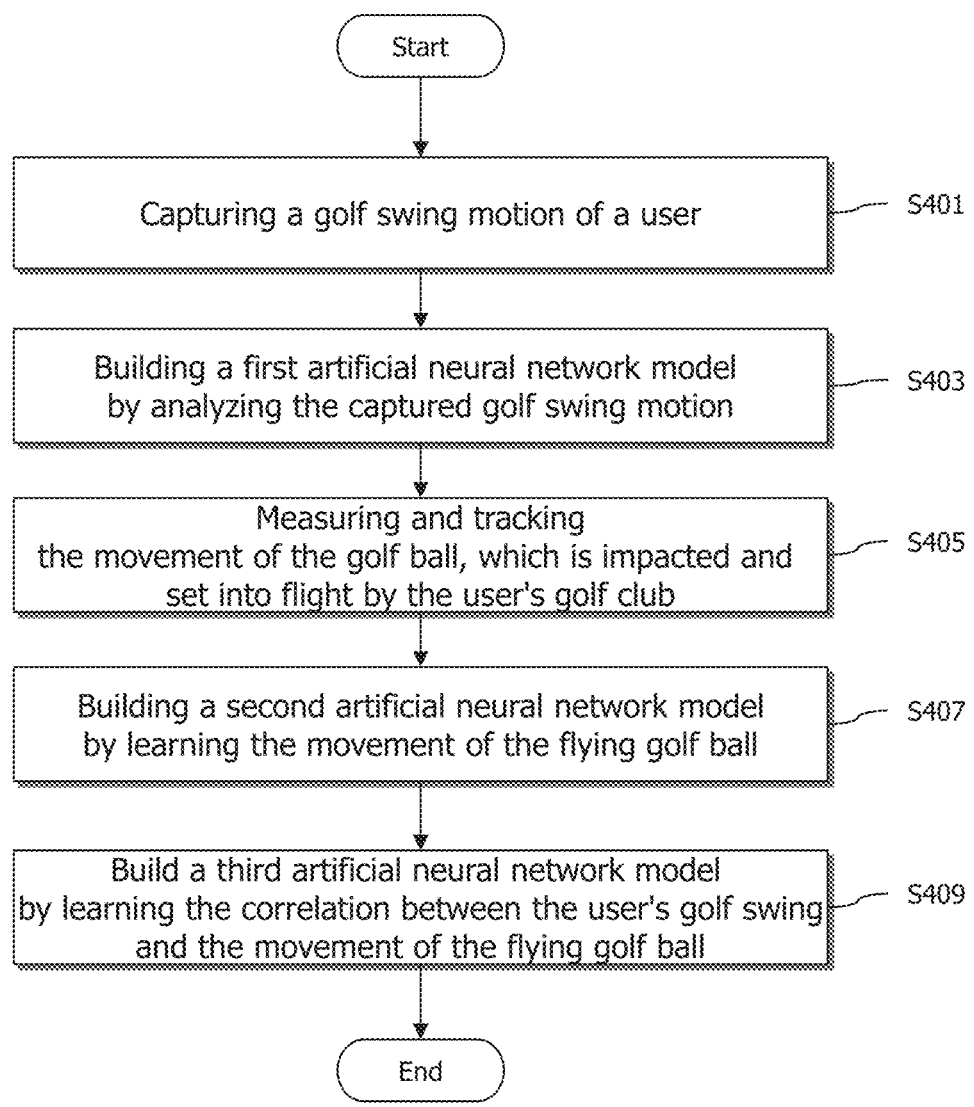
FIG. 4 is an exemplary diagram illustrating the learning method according to the first disclosure.
Figure 5A:
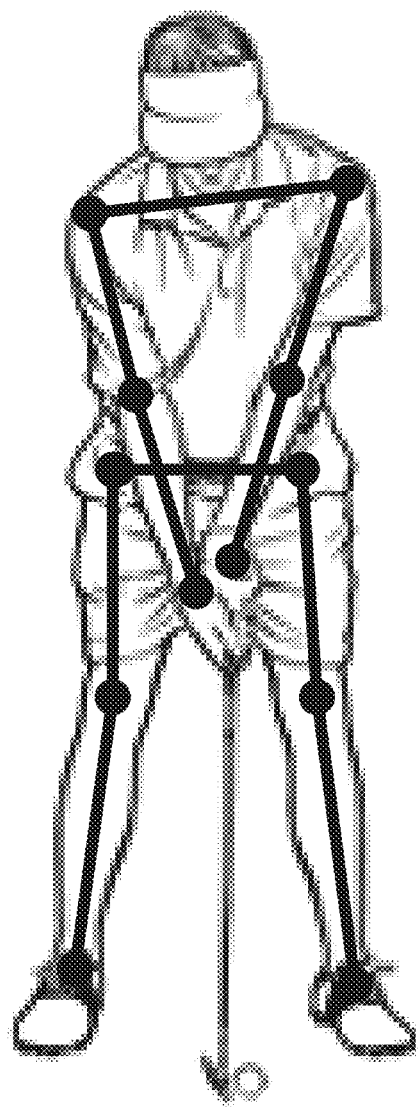
FIGS. 5A to 5B illustrate an example of pose estimation using a skeleton during the golf swing process.
Figure 5B:
Figure 6:
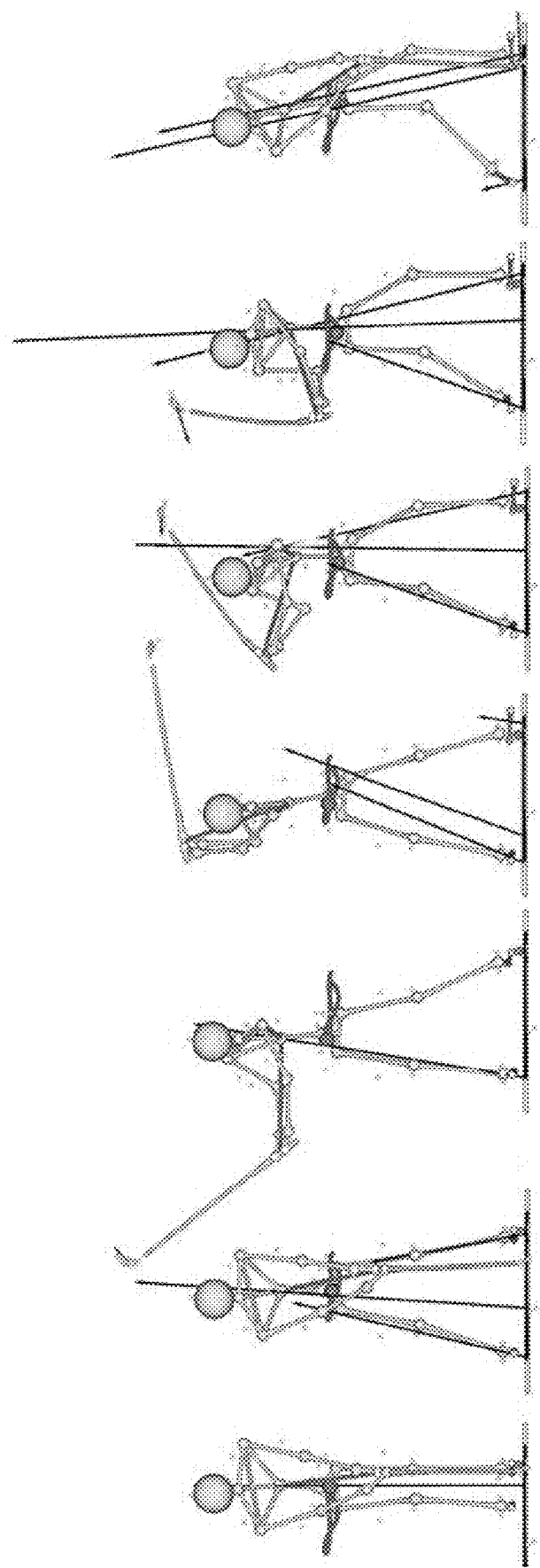
FIG. 6 is an exemplary diagram representing the golf swing process in skeletal form.

FIG. 4 is an exemplary diagram illustrating the learning method according to the first disclosure. FIGS. 5A to 5B illustrate an example of pose estimation using a skeleton during the golf swing process. FIG. 6 is an exemplary diagram representing the golf swing process in skeletal form.

Referring to FIG. 4, as can be understood, the user's golf swing motion (e.g., a golf professional's swing) is captured using a camera S401.

The camera may be positioned in front of or to the side of the user. Alternatively, in one example, the camera may be mounted within an XR device worn on the user's head. When the camera is mounted within the XR device, the recording occurs from a first-person perspective, making this approach more suitable for the methods disclosed in the present specification.

Next, the captured golf swing motion of the user within the video is analyzed and learned to build the first artificial neural network model S403.

Specifically, as illustrated in FIGS. 5a and 5b, the golf swing motion is analyzed on a frame-by-frame basis by estimating the user's skeletal posture in each frame of the video, i.e., by performing pose estimation. Notably, by performing pose estimation at the skeletal level, as shown in FIGS. 5a and 5b, it becomes easier to determine postures that were previously difficult to analyze due to being obscured by the user's clothing. Frame-by-frame pose estimation in the video can be achieved using YOLO, one of the artificial neural network models.

As a result, the correlation between the user's golf swing and the movement of the flying golf ball can be analyzed. Additionally, it becomes possible to accurately identify which part of the golf swing process is incorrect.

The analyzed golf swing motion is then used to train and build the first artificial neural network model. This training process can be performed on a frame-by-frame basis. Additionally, the golf swing motion, which is estimated frame by frame, can be sequentially connected in time order to form a complete golf swing motion, which is also learned.

In the S403 step, not only the movement of the golf club resulting from the user's golf swing (e.g., the angular velocity and acceleration of the golf club head) but also the posture of the golf club (i.e., the angle of the golf club and the angle of the club face) can be analyzed and learned. As can be understood with reference to FIG. 6, the motion of the golf club caused by the golf swing can also be analyzed and learned simultaneously.

The first artificial neural network model built in the S403 step may be based on the aforementioned YOLO. This is because YOLO can demonstrate excellent performance in pose estimation using human skeletal structures.

Next, the movement of the golf ball, which is impacted and set into flight by the user's golf club, is measured and tracked S405. This measurement and tracking can be performed using a stereoscopic method, which is a cost-effective approach traditionally used. However, to improve accuracy, the movement of the golf ball can also be measured and tracked using light of a specific wavelength.

Specifically, after emitting light of a specific wavelength (e.g., a laser), the reflected light can be received to measure the golf ball's launch angle, rotation direction, rotation amount, acceleration, and speed. Additionally, the movement of the golf ball can be continuously tracked, allowing for ongoing measurement or correction of these parameters.

Meanwhile, the movement of the flying golf ball is learned using an artificial neural network model, and then a second artificial neural network model is built S407. Specifically, the movement of the golf ball, as measured and tracked in the S405 step, is analyzed and learned on a frame-by-frame basis, thereby allowing the second artificial neural network model to be constructed.

The second artificial neural network model constructed in the S407 step may be based on SORT (Simple Online and Realtime Tracking) or DEEP SORT.

Next, the correlation between the user's golf swing and the movement of the flying golf ball is analyzed to build a third artificial neural network model S409. The S409 step can be explained as the process of analyzing the correlation between the first artificial neural network model built in the S403 step and the second artificial neural network model built in the S407 step, and then merging them to construct a unified third artificial neural network model.

In other words, unlike the conventional technology illustrated in FIG. 1, which only analyzed the movement of the golf ball and did not analyze the user's golf swing and the corresponding swing trajectory of the golf club, leading to a lack of realism, the first embodiment of the present disclosure overcomes this by analyzing the correlation between the user's golf swing and the movement of the flying golf ball, and then generating a third artificial neural network model that merges these analyses into a single, cohesive model.

If the first artificial neural network model is based on YOLO and the second artificial neural network model is based on SORT or DEEP SORT, the merged third artificial neural network model can be a fusion neural network model. A fusion neural network model refers to the combination of two different types of neural network models into a single model. This fusion neural network model has the advantage of incorporating more parameters, which can increase accuracy.

Specifically, since the flight motion of the golf ball is dependent on the golf swing, incorporating parameters related to the golf swing as part of the parameters used to represent the flight motion of the golf ball can further enhance accuracy. This integrated approach allows the fusion neural network model to more accurately predict and represent the relationship between the golf swing and the resulting ball flight.

Figure 7:
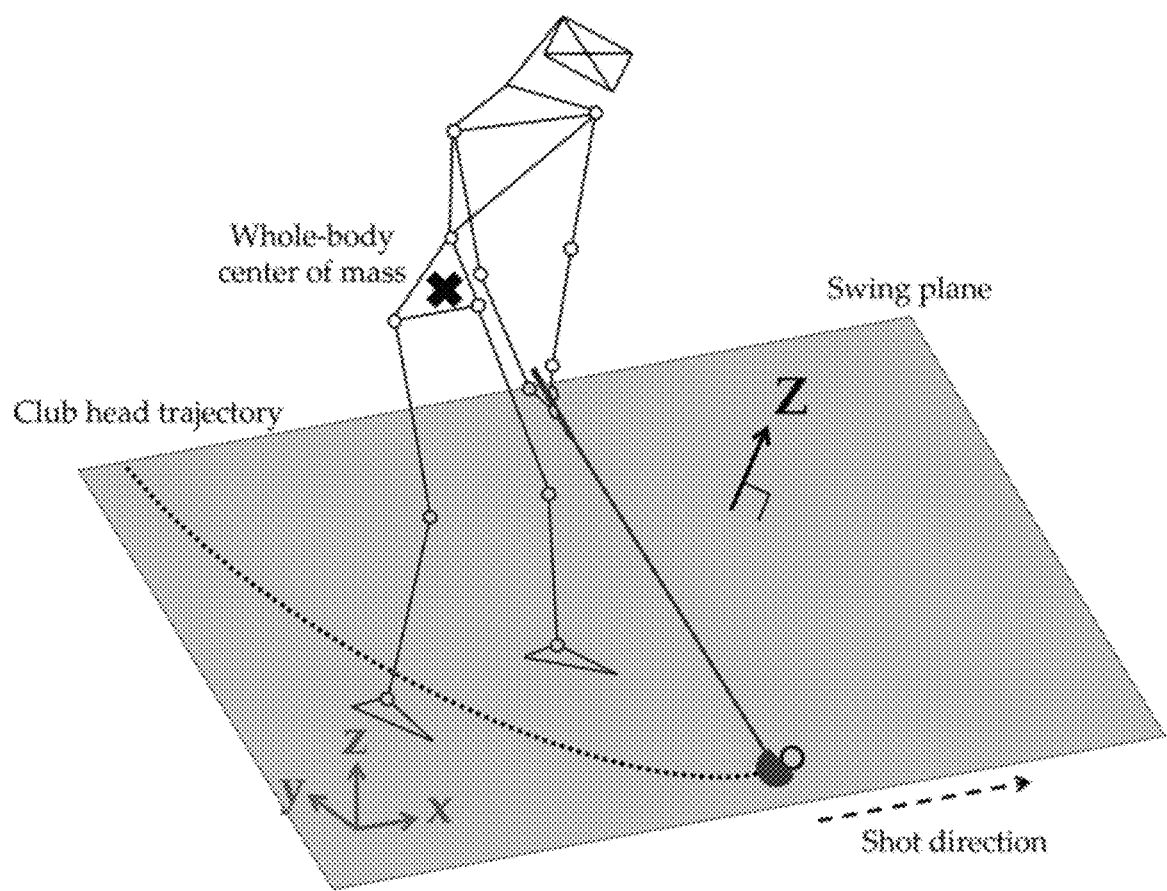
FIG. 7 is an exemplary diagram visualizing the artificial neural network model trained according to the first disclosure.

FIG. 7 is an exemplary diagram visualizing the artificial neural network model trained according to the first disclosure.

Referring to FIG. 7, as can be understood according to the first disclosure, the user's golf swing captured in the video can be simplified and represented as the movement of a skeleton. By simplifying the golf swing to the movement of the skeleton in this way, it becomes easy to calculate the angular velocity and speed of the hand swinging the golf club through kinematics, and furthermore, to determine the angular velocity and speed of the golf club head.

Therefore, if the weight of the golf club is known, the impulse applied to the golf ball can also be calculated. Information regarding the weight of the golf club can typically be obtained by recognizing the golf club through vision-based recognition and then retrieving this information from a database. Additionally, the impulse applied to the golf ball can be determined from the ball's momentum according to general physical laws.

Moreover, as illustrated in FIG. 7, the trajectory of the golf club head can also be learned and incorporated into the neural network model.

Although not explicitly shown in FIG. 7, as previously mentioned, the angle of the golf club face can also be learned and integrated into the neural network model.

II. Second Disclosure of the Specification

The second embodiment of the present disclosure proposes a method for providing a virtual golf game service through an XR device using the artificial neural network model constructed according to the first embodiment described above.

Figure 8:
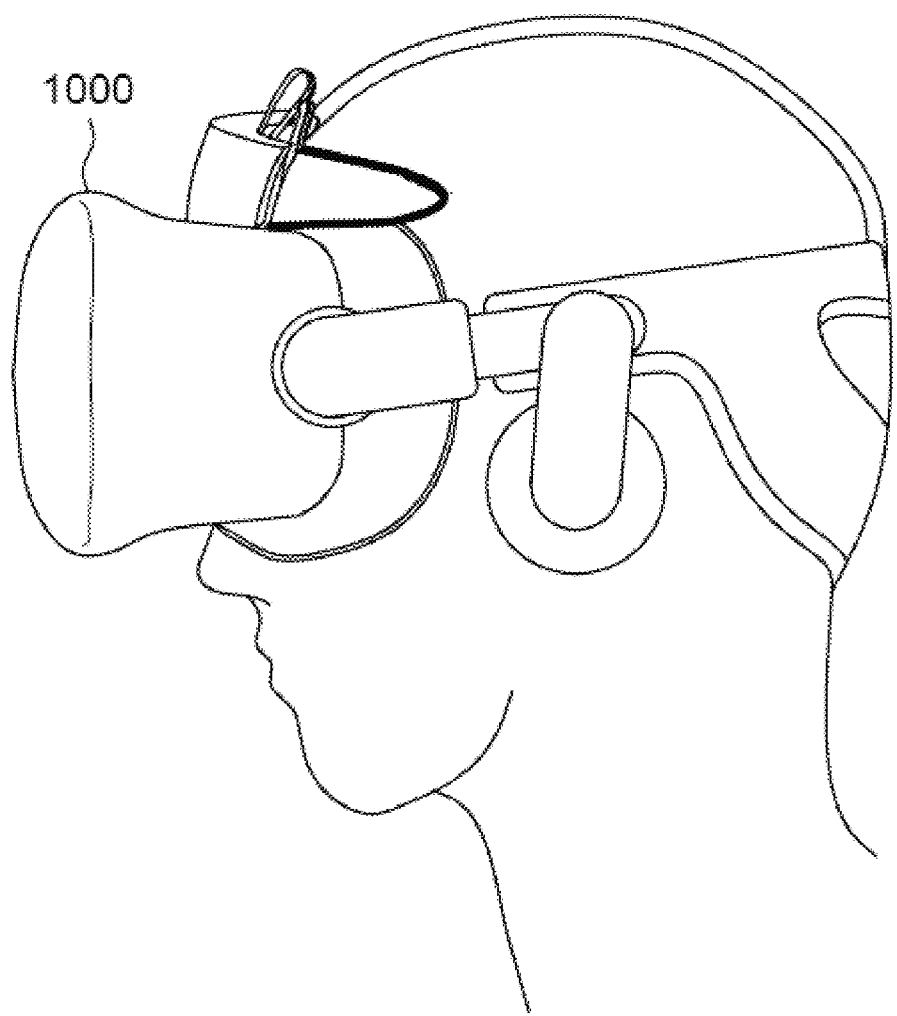
FIG. 8 is an exemplary diagram illustrating an example of an XR device used in the second disclosure.

FIG. 8 is an exemplary diagram illustrating an example of an XR device used in the second disclosure.

As illustrated in FIG. 8, an eXtended Reality (XR) device can be utilized to provide a virtual golf game service. XR encompasses Virtual Reality (VR), Augmented Reality (AR), and Mixed Reality (MR). VR technology provides computer-generated (CG) images of objects or backgrounds from the real world, while AR technology overlays CG images onto real-world object images. MR technology combines and blends virtual objects with the real world, offering a more integrated computer graphics experience.

MR technology is similar to AR in that it displays both real and virtual objects together. However, the difference lies in their usage: in AR, virtual objects are typically used to complement real objects, whereas in MR, virtual and real objects are used in an equivalent manner.

XR technology can be applied to various devices such as Head-Mounted Displays (HMDs), Head-Up Displays (HUDs), smartphones, tablets, laptops, desktops, TVs, and digital signage. Devices equipped with XR technology can be referred to as XR devices (XR Device).

Figure 9:
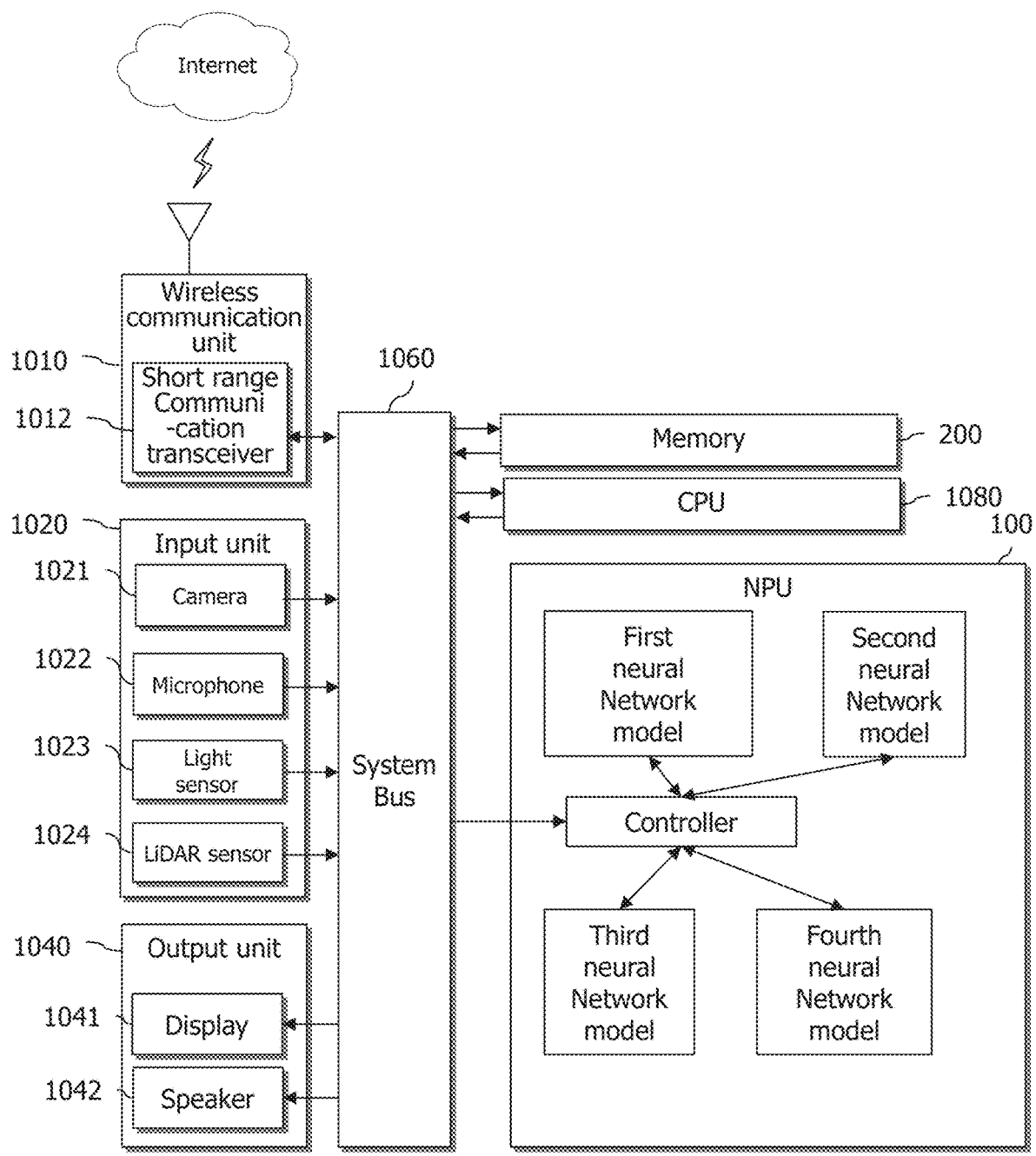
FIG. 9 exemplarily illustrates the configuration of the XR device shown in FIG. 8.

FIG. 9 exemplarily illustrates the configuration of the XR device shown in FIG. 8.

Referring FIG. 9, the XR device 1000 may include a neural processing unit (NPU) 100, memory 200, a wireless communication unit 1010, an input unit 1020, an output unit 1040, a system bus 1060, and a central processing unit (CPU) 1080.

The wireless communication unit 1010 may include a short-range communication transceiver 1012.

The short-range communication transceiver 1012 of the wireless communication unit 1010 is a transceiver for short-range communication that includes, for example, wireless LAN (WLAN), wireless fidelity (Wi-Fi), Wi-Fi Direct, radio frequency identification (RFID) using Bluetooth, infrared data association (IrDA), ultra-wideband (UWB), ZigBee, near-field communication (NFC), wireless universal serial bus (Wireless USB), etc. However, the embodiments according to the present disclosure are not limited thereto.

The output unit 1040 may include a display 1041 and a speaker 1042.

The XR device 1000 may receive video content for the XR device, such as golf course imagery, from a server on the network via the wireless communication unit (1010). The received video content may be transmitted to the CPU 1080. The CPU 1080 may include a decoder and may decode the video content for display on the display 1041.

The input unit 1020 may include various components that provide various data or signals inputted into the XR device 1000. The input unit 1020 may include a camera 1021 for video signal input, a microphone 1022 for audio signal input, a light sensor 1023, and a LiDAR sensor 1024, among others.

The camera (1021) of the input unit (1020) may include at least one of a visible light camera, a near-infrared camera, and a TrueDepth camera. However, the invention is not limited thereto, and the camera 1021 may include composite image sensor capable of detecting both visible light and near-infrared light simultaneously, thereby enabling simultaneous detection of visible and near-infrared light.

The camera 1021 may be plural in number. Among the plurality of cameras, a first plurality of cameras may be arranged to forward. This first plurality of cameras may be responsible for capturing images in a stereoscopic manner to detect and track a golf ball. Additionally, the first plurality of cameras may be responsible for capturing images in a stereoscopic manner to detect and track the user's golf swing (i.e., the user's arm movements) and the resulting movement of the golf club.

Furthermore, among the plurality of cameras, a second plurality of cameras may be arranged to downward. This second plurality of cameras may be responsible for capturing images to detect and track the motion of the user's lower body, which may not be captured by the first plurality of cameras.

The LiDAR sensor 1024 may be used to detect a golf ball placed in the real world (i.e., to detect the golf ball when the user assumes a golf address posture) and to accurately measure and track the coordinates and distance of the golf ball. Additionally, the LiDAR sensor 1024 may be used to accurately measure and track the angle and trajectory of the golf club head as it approaches the golf ball.

The display 1041 may output XR images under the control of the CPU 1080. The display 1041 may include transparent glass.

The NPU 100 may perform computations for a plurality of artificial neural network models required for providing virtual golf services. For example, the plurality of artificial neural network models may include one or more of a first artificial neural network model for object detection, object segmentation, or object tracking; a second artificial neural network model for pose estimation; a third artificial neural network model for scaling; and a fourth artificial neural network model for motion prediction.

When the actual golf ball placed on the actual ground is captured as an image through the camera 1021 of the XR device 1000, the first artificial neural network model may detect the golf ball as an object within the image. Additionally, the first artificial neural network model may segment the golf ball as an object within the image. In this case, the segmented golf ball image may be displayed within the virtual golf environment shown on the display 1041 of the XR device 1000. Furthermore, if the user strikes the actual golf ball placed on the ground with a golf club during a golf swing, causing the ball to fly, the first artificial neural network model may track the flight of the golf ball. Consequently, in the virtual golf environment displayed on the display 1041 of the XR device 1000, the image of the golf ball may be shown as flying.

Meanwhile, when the user performs a golf swing while wearing the XR device 1000, the user's arm movements and the corresponding motion of the golf club are captured through the first plurality of cameras, which are arranged to forward among the cameras 1021 of the XR device 1000. Simultaneously, the motion of the user's lower body is detected through the second plurality of cameras, which are arranged to downward. The second artificial neural network model then analyzes the user's golf swing motion. In other words, when the user performs a golf swing while wearing the XR device 1000, the golf swing is analyzed based on the skeletal structure as illustrated in FIGS. 5a to 5b or FIG. 6, using the first plurality of cameras and the second plurality of cameras of the XR device 1000. Consequently, in the virtual golf environment displayed on the display 1041 of the XR device 1000, the user's golf swing may be faithfully reproduced and displayed.

The third artificial neural network model for scaling is designed to scale a pre-stored golf swing of a professional golfer to match the user's body size. For example, suppose the user wishes to have both their own golf swing and Tiger Woods' golf swing displayed on the display 1041 of the XR device 1000. In this case, if there is a significant height difference between the user and Tiger Woods, it may be difficult for the user to intuitively compare their golf swing with Tiger Woods' golf swing. Therefore, the third artificial neural network model can scale Tiger Woods' golf swing to match the user's height.

To achieve this, the user may scan their body in advance using the TrueDepth camera among the LiDAR sensor 1024 or the camera 1021 of the XR device 1000, so that their physical information (e.g., height, arm length, leg length, etc.) is input into the XR device 1000.

The fourth artificial neural network model may be used to predict the flight of a golf ball. For example, suppose a user performs a golf swing while wearing the XR device 1000 in the center of a real space measuring 4 meters wide, 4 meters long, and 3 meters high. Since the user performed the golf swing in the center of the real space, the golf ball would travel only 2 meters before hitting a wall. The first artificial neural network model is used to track the golf ball from the moment it is struck by the golf club during the golf swing until just before it hits the wall.

However, the fourth artificial neural network model is designed to predict the continued flight of the golf ball within the virtual golf environment displayed on the display 1041 of the XR device 1000, even after the actual golf ball has hit the wall in the real-world space. Based on the flight path of the golf ball up until the point it was about to hit the wall, the fourth artificial neural network model can predict the future flight path of the golf ball.

In this way, the image of the golf ball can continue to be displayed as flying forward within the virtual golf environment, despite the actual golf ball having collided with the wall.

Additionally, the fourth artificial neural network model can generate a complete golf swing based on a partial golf swing captured by the camera 1021 of the XR device 1000, such as the first plurality of cameras arranged to forward or the second plurality of cameras arranged to downward. For example, if the field of view of the camera 1021 of the XR device 1000 is narrow, and a portion of the user's golf swing motion is not captured, the fourth artificial neural network model can generate the missing portion of the golf swing.

Figure 10:
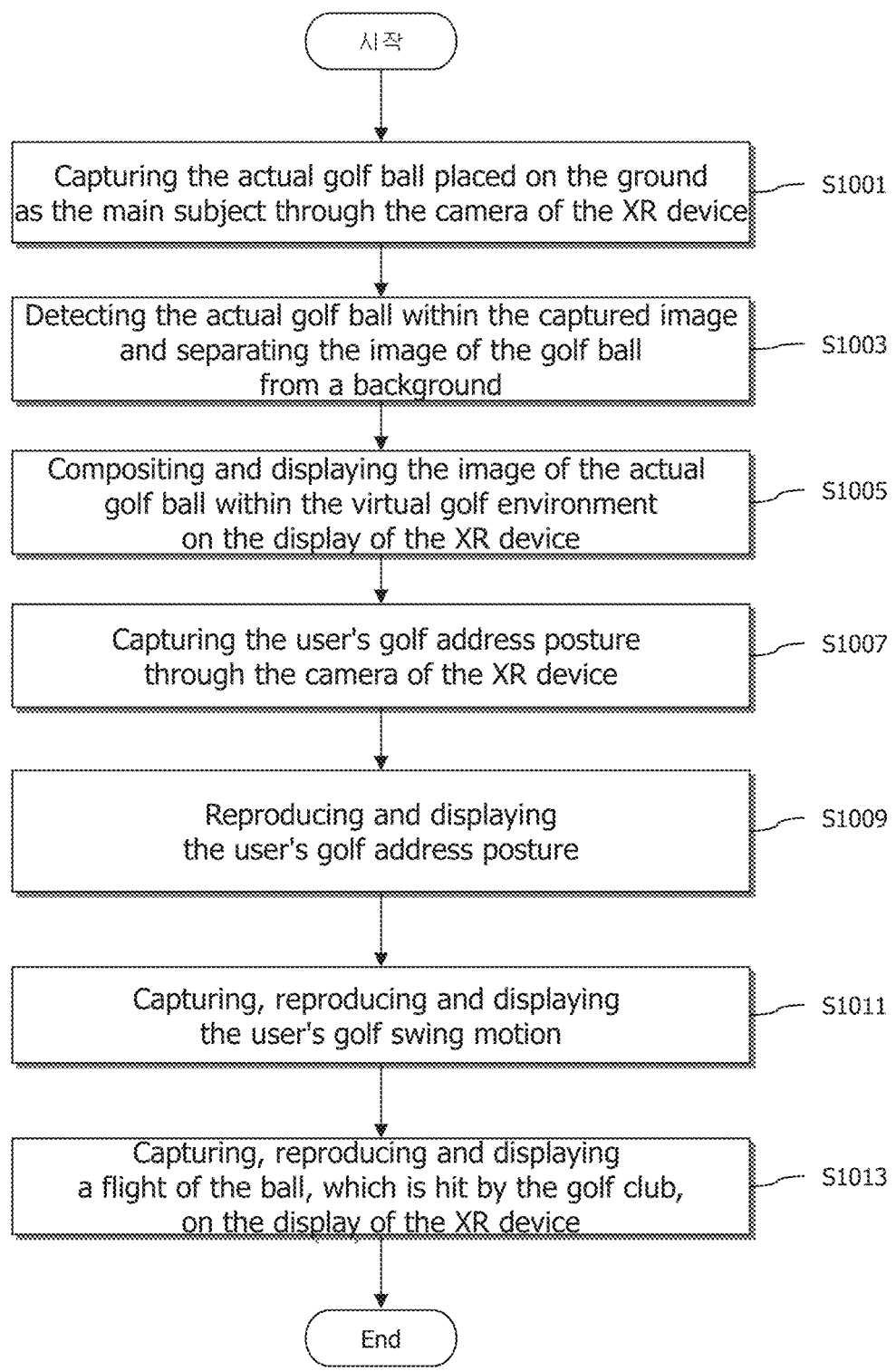
FIG. 10 is an exemplary diagram illustrating a method according to an example of the second disclosure.
Figure 11:
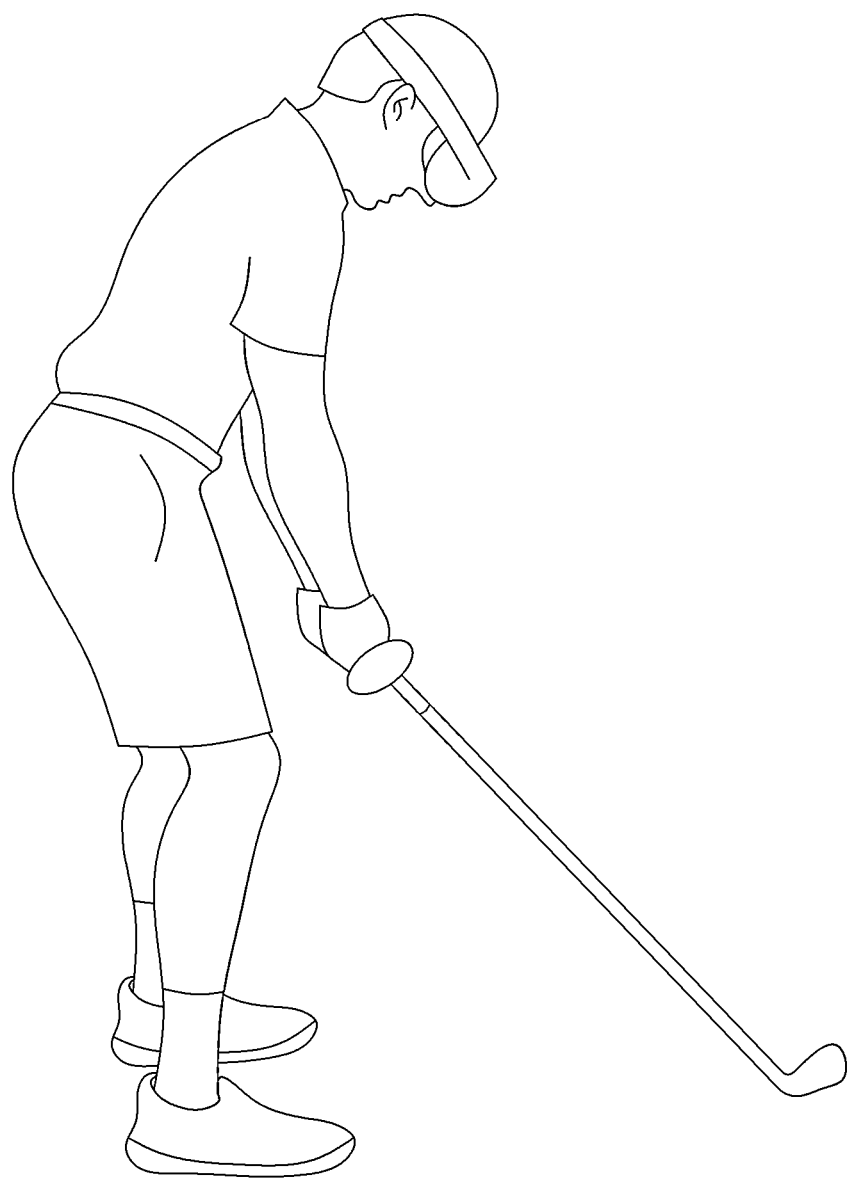
FIG. 11 is an exemplary diagram illustrating a user enjoying golf while wearing an XR device.
Figure 12:
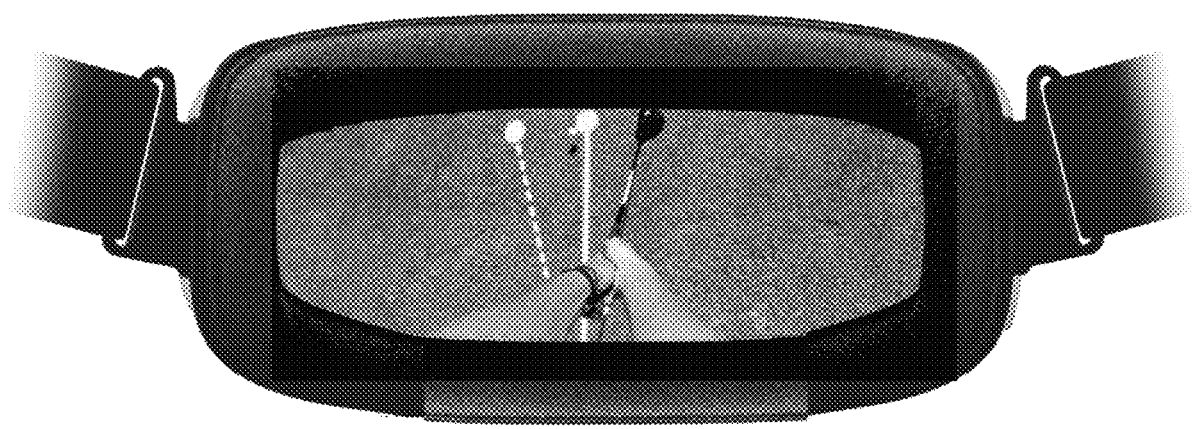
FIG. 12 is an exemplary diagram illustrating a virtual golf environment displayed on the display of the XR device.

FIG. 10 is an exemplary diagram illustrating a method according to an example of the second disclosure, FIG. 11 is an exemplary diagram illustrating a user enjoying golf while wearing an XR device, and FIG. 12 is an exemplary diagram illustrating a virtual golf environment displayed on the display of the XR device.

Referring to FIG. 10, as can be understood, the actual golf ball placed on the ground may be captured as the main subject through the camera of the XR device S1001.

Then, using an artificial neural network for object detection/object segmentation, the actual golf ball may be detected within the captured image, and the image of the golf ball may be separated from the background S1003.

Next, the image of the actual golf ball may be composited and displayed within the virtual golf environment shown on the display of the XR device S1005.

Subsequently, the user's golf address posture may also be captured through the camera of the XR device S1007.

Then, the user's golf address posture may be reproduced and displayed within the virtual golf environment shown on the display of the XR device S1009.

The user's golf swing motion, captured through the camera of the XR device, may be reproduced and displayed S1011 within the virtual golf environment shown on the display of the XR device, as illustrated in FIG. 12.

Following the impact of the golf club on the actual ball, in accordance with the user's golf swing motion, the flight of the ball may be captured through the camera of the XR device and displayed within the virtual golf environment on the display of the XR device S1013.

Figure 13:
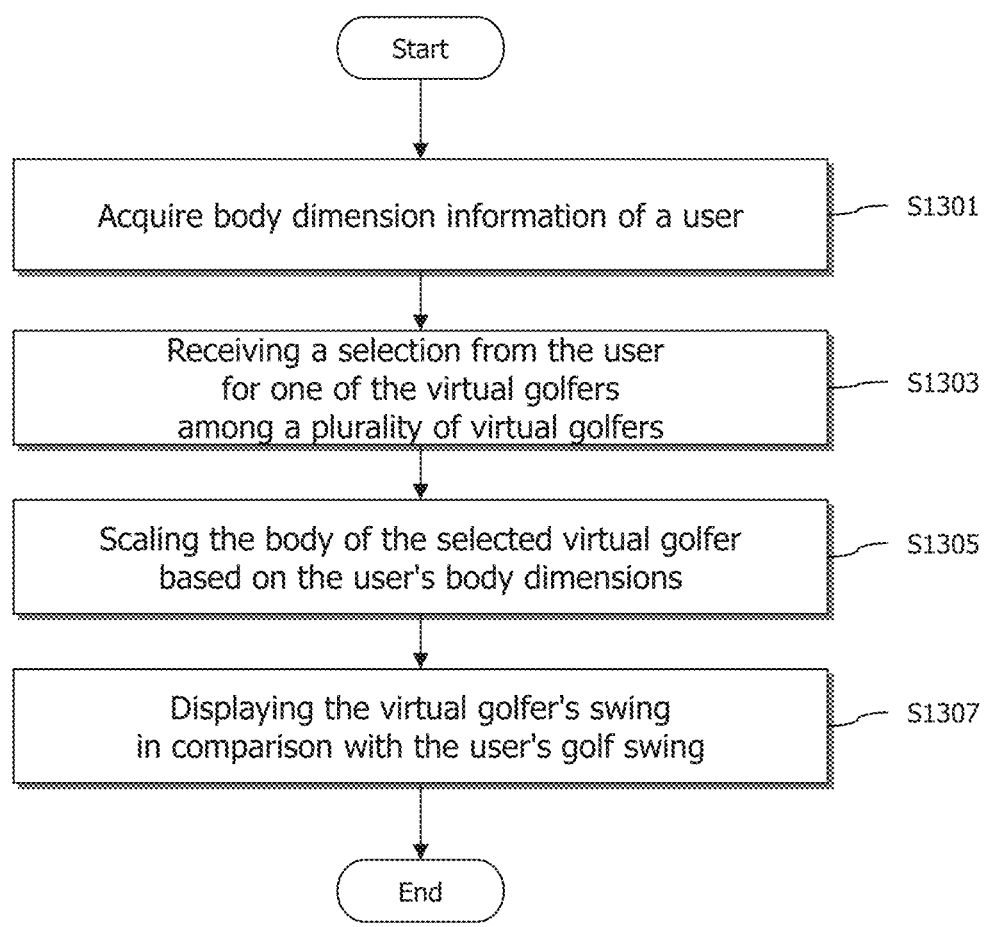
FIG. 13 is an exemplary diagram illustrating a method according to another example of the second embodiment disclosed herein.

FIG. 13 is an exemplary diagram illustrating a method according to another example of the second embodiment disclosed herein.

First, the XR device 1000 may acquire the user's body information through a LiDAR sensor or a TrueDepth camera S1301.

Next, the XR device 1000 may receive a selection from the user for one of the virtual golfers among a plurality of virtual golfers S1303.

Subsequently, the XR device 1000 may scale the body of the selected virtual golfer based on the user's body dimensions S1305.

The XR device 1000 may then display the user's golf swing and the virtual golfer's swing within the virtual golf environment on the display, so they can be compared S1307.

The examples of the present disclosure described herein and illustrated in the drawings are provided merely to facilitate understanding of the invention by presenting specific examples, and are not intended to limit the scope of the present disclosure. It will be apparent to those skilled in the art that various other modifications and variations can be made without departing from the scope and spirit of the invention as disclosed.

The embodiments of the present disclosure illustrated in the present specification and the drawings are just to provide specific examples to easily describe the technical contents of the present disclosure and help the understanding of the present disclosure and are not intended to limit the scope of the present disclosure. In addition to the embodiments described above, it will be apparent to those skilled in the art that other modifications can be implemented.

This work was supported by Institute of Information & communications Technology Planning & Evaluation (IITP) under the metaverse support program to nurture the best talents (IITP-2024-RS-2023-00256615) grant funded by the Korea government (MSIT).

What is claimed is:

1. A method for providing an immersive virtual golf service using an eXtended Reality (XR), the method comprising:
    capturing an image of an actual golf ball placed on a ground through a first plurality of cameras which are arranged to face forward of the XR device and a second plurality of cameras which are arranged to face downward of the XR device;
    reproducing and displaying the image within a virtual golf environment displayed on a display unit of the XR device;
    capturing, in real-time, a golf swing of a user through the first plurality of cameras and the second plurality of cameras;
    analyzing a golf swing motion of the user in real-time using an artificial neural network model; and
    reproducing and displaying the analyzed golf swing motion within the virtual golf environment displayed on the display unit of the XR device.

2. The method of claim 1, wherein the artificial neural network model is stored in the XR device.

3. The method of claim 1, wherein the artificial neural network model includes:
    a first artificial neural network model configured for object detection, object segmentation, or object tracking.

4. The method of claim 1, wherein the artificial neural network model includes:
    a second artificial neural network model configured for a pose estimation.

5. The method of claim 1, wherein the artificial neural network model includes:
    a third artificial neural network model configured for scaling.

6. The method of claim 1, wherein the artificial neural network model includes:
    a fourth artificial neural network model configured for motion prediction.

7. The method of claim 1, wherein the XR device includes a neural processing unit configured to perform computations for the artificial neural network model.

8. The method of claim 1, further comprising:
displaying a virtual golfer's swing in caparison with a user's golf swing.

9. The method of claim 1, further comprising:
scaling a body of a virtual golfer displayed on the XR device based on body dimensions of the user.

10. An eXtended Reality (XR) device comprising:
a first plurality of cameras which are arranged to face forward;
a second plurality of cameras which are arranged to face downward;
a display unit; and
a controller configured to control the camera and display and perform steps of:
capturing an image of an actual golf ball placed on a ground through the first plurality of cameras and the second plurality of cameras,
reproducing and displaying the image within a virtual golf environment displayed on the display unit,
capturing, in real-time, a golf swing of a user through the first plurality of cameras and the second plurality of cameras,
analyzing a golf swing motion of the user in real-time using an artificial neural network model, and
reproducing and displaying the analyzed golf swing motion within the virtual golf environment displayed on the display unit.

11. The XR device of claim 10, wherein the artificial neural network model is stored in the XR device.

12. The XR device of claim 10, wherein the artificial neural network model includes:
a first artificial neural network model configured for object detection, object segmentation, or object tracking.

13. The XR device of claim 10, wherein the artificial neural network model includes:
a second artificial neural network model configured for a pose estimation.

14. The XR device of claim 10 wherein the artificial neural network model includes:
a third artificial neural network model configured for scaling.

15. The XR device of claim 10, wherein the artificial neural network model includes:
a fourth artificial neural network model configured for motion prediction.

16. A non-volatile computer-readable storage medium storing instructions, the instructions, when executed by one or more processors, causing the one or more processors to perform steps comprising:
capturing an image of an actual golf ball placed on a ground through a camera of an eXtended Reality (XR) device,
wherein the camera of the XR device includes a first plurality of cameras which are arranged to face forward and a second plurality of cameras which are arranged to face downward;
reproducing and displaying the image within a virtual golf environment displayed on a display unit of the XR device;
capturing, in real-time, a golf swing of a user through the first plurality of cameras and the second plurality of cameras;
analyzing a golf swing motion of the user in real-time using an artificial neural network model; and
reproducing and displaying the analyzed golf swing motion within the virtual golf environment displayed on the display unit of the XR device.

* * * * *